United States Patent
Gates et al.

(10) Patent No.: US 8,042,528 B2
(45) Date of Patent: Oct. 25, 2011

(54) ADAPTIVE EGR CONTROL FOR INTERNAL COMBUSTION ENGINES

(75) Inventors: Freeman Carter Gates, Bloomfield Hills, MI (US); Songping Yu, Troy, MI (US); Sassan Farahmand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 12/533,576

(22) Filed: Jul. 31, 2009

(65) Prior Publication Data

US 2011/0023847 A1 Feb. 3, 2011

(51) Int. Cl.
*F02B 47/08* (2006.01)
*F02B 47/00* (2006.01)
(52) U.S. Cl. .................................. 123/568.21
(58) Field of Classification Search ............ 123/568.15, 123/568.22, 568.21, 568.11; 701/108; 60/276, 60/605.2; 73/861.42
See application file for complete search history.

(56) References Cited

U.S. PATENT DOCUMENTS

| | | | | |
|---|---|---|---|---|
| 5,190,017 A * | 3/1993 | Cullen et al. | ............... | 123/676 |
| 5,203,313 A * | 4/1993 | Rotarius | ............... | 123/568.27 |
| 5,613,479 A * | 3/1997 | Gates et al. | ............... | 123/568.27 |
| 6,182,644 B1 | 2/2001 | Kotwicki et al. | | |
| 6,434,474 B1 * | 8/2002 | Kotwicki et al. | ............... | 701/108 |
| 6,588,210 B2 | 7/2003 | Kreso | | |
| 6,837,227 B2 | 1/2005 | Jaliwala et al. | | |
| 6,880,524 B2 | 4/2005 | Gates et al. | | |
| 7,076,953 B2 | 7/2006 | Kreso | | |
| 7,155,332 B2 | 12/2006 | Yamada et al. | | |
| 7,159,602 B2 | 1/2007 | Halvorsen | | |
| 7,231,906 B1 | 6/2007 | Haskara et al. | | |
| 7,261,098 B2 | 8/2007 | Vigild et al. | | |
| 7,367,188 B2 | 5/2008 | Barbe et al. | | |
| 7,474,954 B1 | 1/2009 | Zagone | | |
| 7,493,762 B2 | 2/2009 | Barbe et al. | | |
| 2001/0029935 A1 * | 10/2001 | Cook | ............... | 123/568.27 |
| 2002/0059797 A1 * | 5/2002 | Kreso | ............... | 60/602 |
| 2002/0121267 A1 | 9/2002 | Denz | | |
| 2003/0061888 A1 | 4/2003 | Gould et al. | | |
| 2007/0044768 A1 | 3/2007 | Eick et al. | | |

OTHER PUBLICATIONS

Transwiki, Mass Flow by Square Root Extraction [online], Apr. 15, 2008 [retrieved on Apr. 15, 2011]. Retrieved from the Internet<URL: http://wiki.xtronics.com/inex.php/Mass_Flow_by_square_root_extraction>.*

* cited by examiner

*Primary Examiner* — Mahmoud Gimie
(74) *Attorney, Agent, or Firm* — Julia Voutyras; Brooks Kushman P.C.

(57) ABSTRACT

A system and method for controlling an internal combustion engine having an EGR valve determine a base valve position to deliver a target flow using a stored map and adjust the base position in response to differential pressure across an orifice in the EGR flow to move the valve to a position different from the base position to provide the target flow.

20 Claims, 4 Drawing Sheets

ADAPTIVE EGR CONTROL FOR INTERNAL COMBUSTION ENGINES

BACKGROUND

1. Technical Field

The present disclosure relates to adaptive control of exhaust gas recirculation (EGR) for internal combustion engines.

2. Background Art

Exhaust gas recirculation (EGR) is a well known technique used in various types of internal combustion engines to reduce NOx generation during combustion. To control EGR flow, external EGR systems typically use either a linear solenoid or DC motor to change the EGR valve position with feedback provided by a position sensor for closed loop control. To provide a desired EGR mass flow rate into the engine intake system, the valve position is changed with the corresponding position sensor voltage stored in a look-up table or map over a range of engine speed/load or torque during vehicle system development. However, as the EGR flow degrades during actual operation due to deposit build-up in the EGR valve, EGR cooler, and/or associated piping, the previously stored map or look-up table representing the relationship between the position sensor voltage and EGR mass flow rate becomes less accurate. While various strategies have been developed to measure or estimate actual EGR flow, many require additional sensors that increase cost and complexity and may present challenges for reliability and durability due to the harsh operating environment within the EGR passages. In addition, many EGR control strategies are difficult to incorporate or retrofit into existing systems.

SUMMARY

A system and method for controlling an internal combustion engine having an EGR valve include determining a base valve position to deliver a target flow using a stored map and adjusting the base position in response to differential pressure across an orifice in the EGR flow to move the valve to a position different from the base position to provide the target flow.

In one embodiment, an actual EGR flow is measured or estimated based on differential pressure across a sharp edge orifice, which may be positioned upstream or downstream of the EGR valve. In one embodiment, the EGR valve gasket provides a sharp edge orifice for the EGR flow. Differential pressure may be determined immediately upstream and downstream of the orifice using a dedicated differential pressure sensor, or may be determined using existing sensors, such as an engine backpressure (EBP) sensor and manifold absolute pressure (MAP) sensor, for example.

In other embodiments, a system and method determine a desired EGR mass flow from a stored table using current engine speed and load. The desired EGR mass flow is used to determine a target EGR valve position based on a previously determined relationship between EGR mass flow and delta pressure. When ambient and engine operating conditions are suitable, an adaptive or corrective valve position is determined and used to adjust the target EGR valve position to provide the desired EGR mass flow.

One embodiment includes an EGR flow diagnostic monitor that compares degradation of EGR flow to a predetermined or adaptive threshold to trigger diagnostic or remedial control actions.

Embodiments of the present disclosure provide various advantages. For example, EGR flow control according to the present disclosure may be implemented primarily in control logic or software with an orifice provided by an EGR valve gasket that may be applied to existing systems. Embodiments of the present disclosure may be used to provide a flow monitor for EGR flow diagnostic purposes to detect flow degradation and reduce occurrences of diagnostic codes associated with out of range position sensors.

The above advantages and other advantages and features of associated with the present disclosure will be readily apparent from the following detailed description of the preferred embodiments when taken in connection with the accompanying drawings.

DETAILED DESCRIPTION

As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
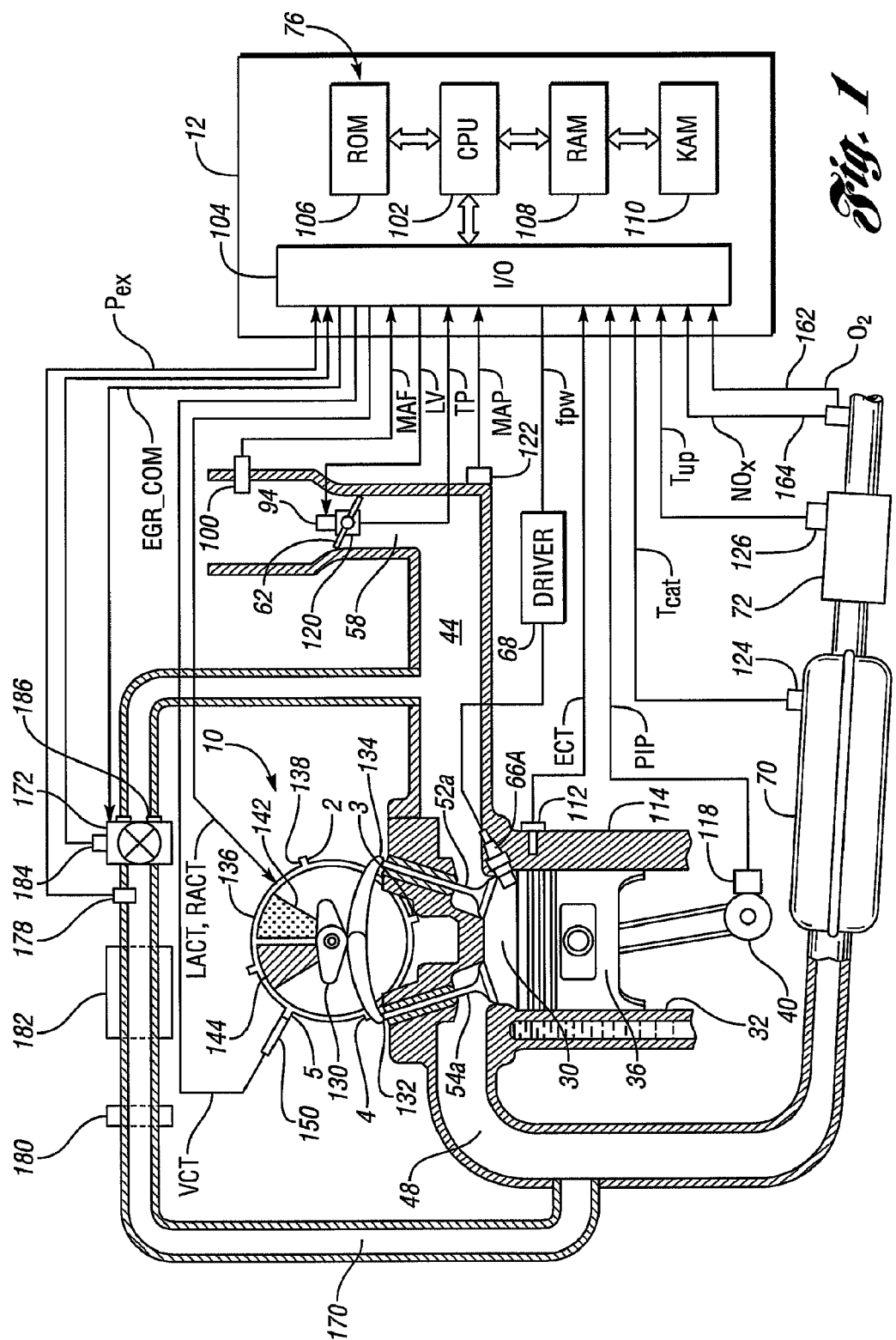
FIG. 1 is a block diagram illustrating operation of a system or method for controlling EGR according to one embodiment of the present disclosure.

As illustrated in FIG. 1, internal combustion engine 10 includes a plurality of combustion chambers 30 and is controlled by an electronic engine controller 12. In the illustrated embodiment, engine 10 is a compression-ignition internal combustion engine with direct injection. Those of ordinary skill in the art will recognize that the EGR control of the present disclosure is independent of the particular engine technology and may be used in various other types of engines, including spark-ignition direct injected or port injected engines, for example.

Combustion chamber 30 includes combustion chamber walls 32 with piston 36 positioned therein and connected to crankshaft 40. Combustion chamber or cylinder 30 communicates with intake manifold 44 and exhaust manifold 48 via respective intake valves 52a and 52b (not shown), and exhaust valves 54a and 54b (not shown). Fuel injector 66A is directly coupled to combustion chamber 30 for delivering liquid fuel directly therein in proportion to the pulse width of signal fpw received from controller 12 via conventional electronic driver 68. Fuel is delivered to fuel injector 66A by a high-pressure fuel system (not shown) including a fuel tank, fuel pumps and a fuel rail as well known.

Intake manifold 44 communicates with throttle body 58 via throttle valve or plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized to control fresh airflow and EGR flow as described herein.

Exhaust after treatment devices may include a nitrogen oxide (NOx) catalyst 70 positioned upstream of a particulate filter 72. NOx catalyst 70 reduces NOx when engine 10 is operating lean of stoichiometry as well known.

Controller 12 is a conventional microcomputer having a microprocessor unit 102, input/output ports 104, and computer readable or electronic storage media 76 for storing data representing code or executable instructions and calibration values. Computer readable storage media 76 may include memory devices functioning as read-only memory 106, random access memory 108, and keep-alive memory 110, for example, in communication with microprocessor unit (CPU) 102 via a conventional data bus. Controller 12 receives various signals from sensors coupled to engine 10 that may include: mass airflow (MAF) from mass airflow sensor 100 coupled to throttle body 58; engine coolant temperature (ECT) from temperature sensor 112 coupled to cooling jacket 114; a profile ignition pickup signal (PIP) from Hall effect sensor 118 coupled to crankshaft 40; and throttle position TP from throttle position sensor 120; and absolute manifold pressure (MAP) from sensor 122. Engine speed signal RPM is generated by controller 12 from signal PIP in a conventional manner and manifold pressure signal MAP from a manifold pressure sensor provides an indication of vacuum, or pressure, in the intake manifold. A sensor 118 may also be used as an engine speed sensor and produces a predetermined number of equally spaced pulses every revolution of the crankshaft.

The exhaust and/or emission control system may include various sensors to provide corresponding signals such as catalyst temperature Tcat provided by temperature sensor 124 and temperature Ttrp provided by temperature sensor 126.

Continuing with FIG. 1, camshaft 130 of engine 10 is coupled to rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a,54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3 and 4 are used for measurement of cam timing and are equally spaced (for example, in a V-8 dual-bank engine, spaced 90 degrees apart from one another) while tooth 5 is preferably used for cylinder identification. In addition, controller 12 sends control signals (LACT,RACT) to conventional solenoid valves (not shown) to control the flow of hydraulic fluid either into advance chamber 142, retard chamber 144, or neither.

Relative cam timing may be determined using known techniques. Generally, the time or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 provides an indication of both oxygen concentration in the exhaust gas as well as NOx concentration. Signal 162 provides controller 12 a voltage indicative of the oxygen concentration, while signal 164 provides a voltage indicative of NOx concentration.

Engine 10 includes an exhaust gas recirculation system having an exhaust passage 170 that allows exhaust gas to flow from exhaust manifold 48 to intake manifold 44. In some applications, exhaust passage 170 may include an EGR catalyst and/or particulate filter 180 and EGR cooler 182. An EGR valve 172 is also disposed within exhaust passage 170, and may be implemented by a linear solenoid valve or DC motor, for example. Valve 172 receives a command signal (EGR_COM) from controller 12 and may include an integral valve position sensor 184 to provide a feedback signal for closed loop control. A large minimally restrictive sharp edged orifice 186 is provided downstream of EGR valve 172 and is implemented by an EGR valve gasket in this embodiment. The particular type of EGR valve may vary by application and implementation and may include an electromagnetic solenoid valve, a vacuum actuated solenoid valve, or a stepper motor actuated valve, for example. Furthermore, the valve opening can be of various types, such as, for example, a sharp edged orifice type, a rotary valve type, or various others.

Exhaust pressure (or backpressure) sensor 174 is positioned upstream of valve 172. Sensor 174 provides an indication of exhaust pressure to controller 12 and may be used in controlling operation of EGR valve 172 as described herein.

In general terms, the present disclosure provides adaptive control of EGR valve 172 to deliver a desired or target EGR mass flow through passage 170 to intake manifold 44 based on current engine and/or ambient operating conditions. The adaptive control compensates for changes in the relationship between EGR valve position and EGR flow for a given differential pressure that may be due to soot accumulation or other build-up within the EGR valve and/or passage. An estimate of actual EGR flow is determined based on pressure upstream and downstream of orifice 186, which is preferably a sharp edge orifice of large diameter to prevent significant flow restriction while providing a stable reference for EGR flow measurement. In one example, EGR flow is determined by a function of the difference between exhaust pressure and intake manifold pressure as determined by sensors 178 and 122, respectively. In an alternate embodiment, EGR flow is estimated based on the product of the manifold pressure and the differential pressure across the orifice 186. Further, estimates of either or both of manifold pressure and exhaust pressure can be determined based on engine operating conditions. For example, intake manifold pressure can be determined based on throttle position and engine speed. Alternatively, exhaust pressure can be determined as a function of engine airflow. Further, various other operating parameters can be included to improve the estimates of pressure, such as, for example, airflow temperature, exhaust temperature, and various others.

Figure 4:
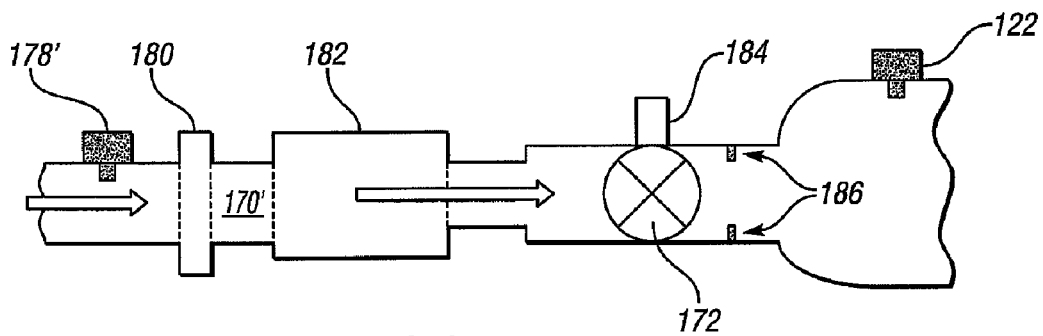
FIGS. 4 and 5 illustrate alternative pressure sensor positioning.
Figure 5:
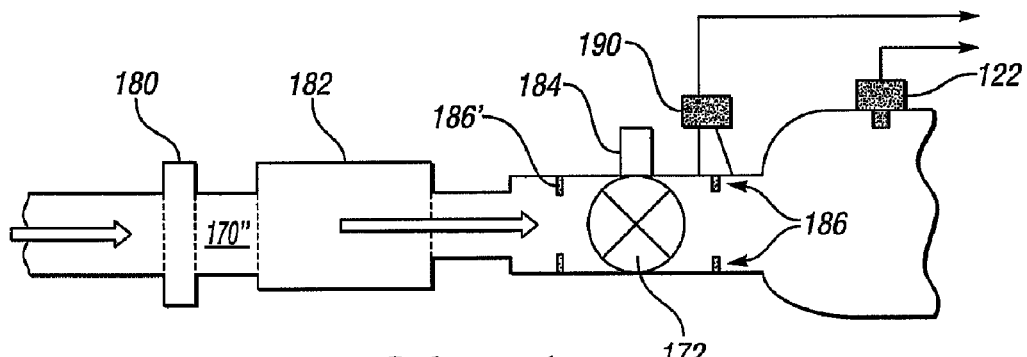

FIGS. 4 and 5 illustrate alternative embodiments of EGR passages 170' and 170", respectively. As shown in FIG. 4, exhaust pressure sensor 178' is positioned upstream of EGR catalyst 180. In the embodiment of FIG. 5, a differential pressure sensor 190 measures pressure immediately upstream and downstream of orifice 186 such that an exhaust pressure sensor 178 is not used for EGR flow control. FIG. 5 also illustrates optional positioning of a flow restricting device or orifice 186' positioned upstream relative to EGR valve 172.

Figure 2:
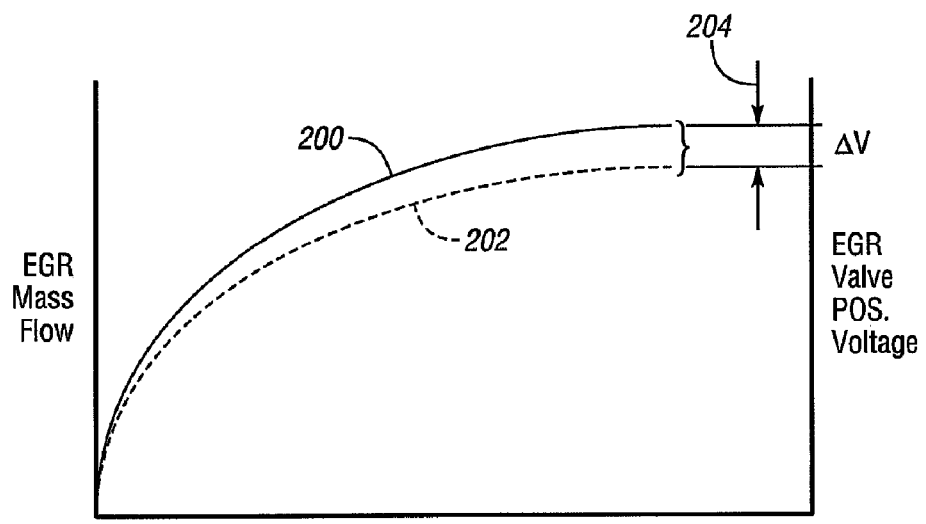
FIG. 2 is a graph illustrating a relationship between EGR mass flow, EGR valve position voltage and differential pressure used in various embodiments of the present disclosure.

FIG. 2 is a graph illustrating a relationship between EGR mass flow, differential pressure, and EGR valve position voltage. In the embodiment of FIG. 2, differential pressure is determined based on exhaust back pressure and manifold absolute pressure (MAP) with the difference multiplied by MAP. The relationship represented by line 200 is determined empirically during development by mapping or recording the EGR valve position (voltage) over a speed/load or torque range to provide a calibrated EGR mass flow rate into the engine intake system. As the EGR flow degrades due to deposit build-up n the EGR valve and/or passages, the actual EGR mass flow for a particular valve position is reduced as represented by line 202. The present disclosure provides adaptive control of the EGR valve position by modifying the EGR valve position voltage by an amount 204 to compensate for deposit build-up and achieve a desired EGR mass flow into the intake manifold. Depending upon the particular sensors and sensor placement used, and the particular type of EGR valve, the values of the illustrated relationship may vary. However, the general shape of the curves 200, 202 will be similar.

Figure 3:
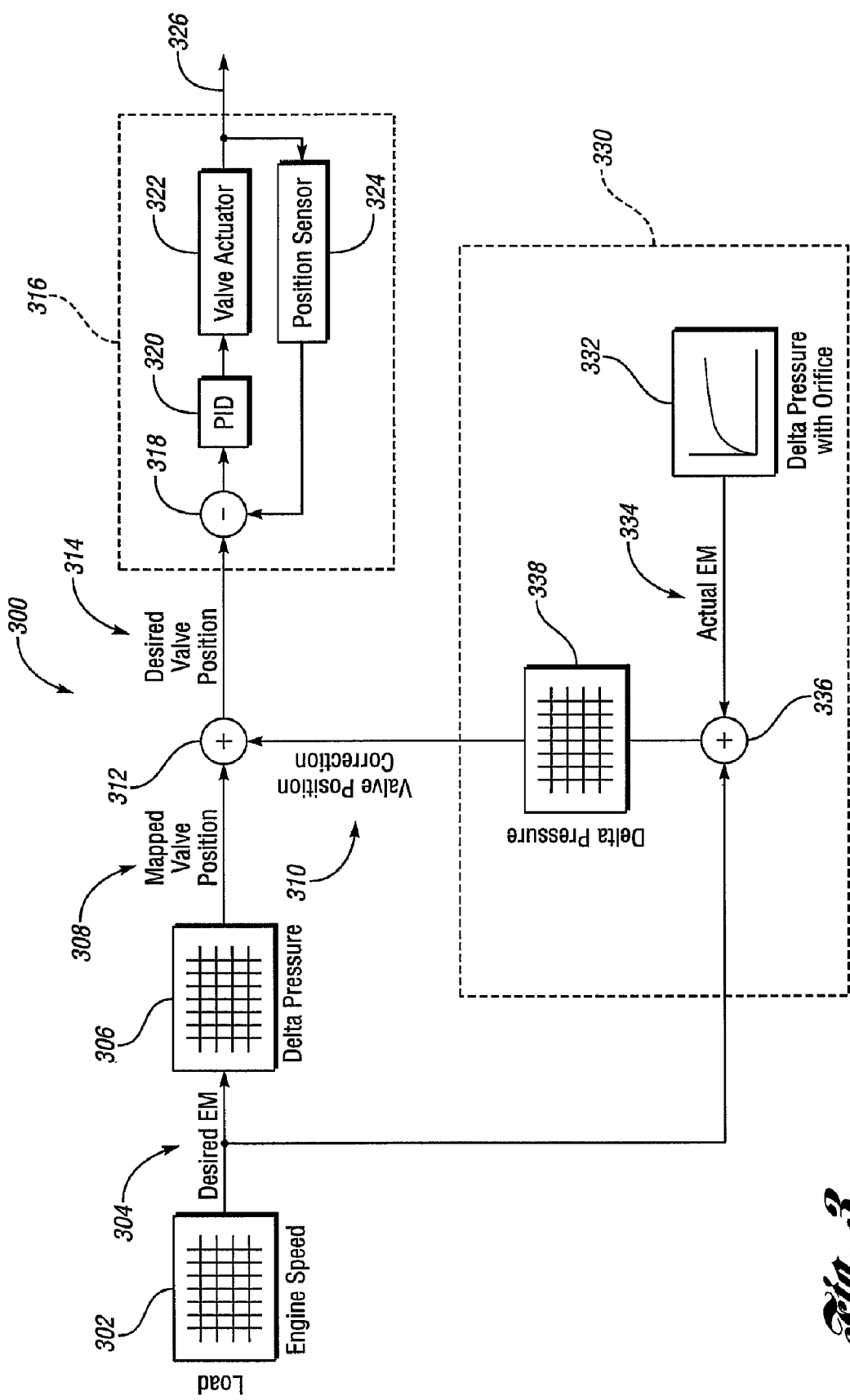
FIG. 3 is a control diagram for a system or method for EGR flow control according to embodiments of the present disclosure.

FIG. 3 is a control block diagram illustrating operation of a system or method for controlling EGR according to the present disclosure. A look-up table or similar device 302 is used to determine a desired EGR mass flow (EM) 304 based on at least one engine and/or ambient operating condition. In the embodiment illustrated, look-up table 302 is used to determine a desired EGR mass flow based on current engine speed and load. The desired EGR mass flow (EM) is then used along with the differential (or delta) pressure to determine a target or mapped EGR valve position 308 from look-up table 306. The mapped or target EGR valve position (voltage) is adjusted by an adaptive valve position correction 310 at block 312 to provide a desired EGR valve position (voltage) 314. The desired/target EGR valve position is provided to feedback controller 316, which implements closed loop feedback control to move the EGR valve to the desired valve position 314.

In the illustrated embodiment, controller 316 uses proportional-integral-derivative (PID) control 320 to generate a valve actuator command 322 with actual valve position determined by position sensor 324 and used as feedback at 318. The resulting command signal 326 is used to drive the EGR valve to the desired valve position. Although the illustrated embodiment uses a PID controller based on the EGR flow error, various other control architectures can be used, such as a proportional controller, or a proportional integral controller, or various other controllers including feedback and feed forward combined control action.

Adaptive control 330 operates only when engine and/or ambient operating parameters are within associated ranges suitable for adaptive learning, i.e. when predetermined entry conditions are satisfied. Entry conditions may include engine speed, load, and temperature conditions, such as only during operation at high load, medium engine speed, and high EGR mass flow for a predetermined time after attaining a predetermined temperature, for example. Entry conditions are generally selected to provide representative stable operating conditions where determinations of actual EGR mass flow are more accurate and may include various other conditions depending upon the particular application and implementation.

When entry conditions are satisfied, a new adaptive valve position correction value 310 may be determined. During subsequent operation, the previously determined adaptive valve position correction value 310 may be used to adjust the mapped valve position 308 for current operating conditions whether or not the adaptive learning entry conditions are satisfied.

During adaptive learning mode, an actual EGR mass flow 334 is determined by measurement or estimation using look-up table 332 based on the differential pressure across an orifice or flow restriction 186. The actual value will vary depending upon the particular implementation as previously described. For embodiments having an orifice 186 positioned upstream of an EGR valve 172, actual EGR mass flow (EM) 334 may be determined according to: EM=K*sqrt(exhaust backpressure−MAP) where K is an empirically determined constant determined based on orifice and EGR valve discharge coefficients, EGR passage pipe geometry, gas constant, and temperature. For embodiments having an orifice 186 positioned downstream of an EGR valve 172, actual EGR mass flow (EM) 334 may be determined according to: EM=K*sqrt(exhaust backpressure−MAP)*MAP where K is a different empirically determine constant determined based on the same parameters previously described. As such, the actual EGR mass flow may be determined based on intake manifold pressure (downstream pressure) and exhaust pressure (upstream pressure).

The actual EGR mass flow (EM) 334 is compared to a desired EGR mass flow at 336. The difference is used with the delta or differential pressure to access look-up table 338 and determine or modify the value for the valve position adjustment or correction 310.

In one embodiment, an EGR flow monitor determines a degradation factor by comparing the initial calibrated pressure differential (EGR mass flow) for a given high flow speed/load or torque operating point with a current value for the same operating point. For example, a degradation factor may be determined based on the difference determined at 336, and/or based on the corresponding valve position correction 310. The degradation factor may be compared to a predetermined threshold and a diagnostic code triggered when the threshold is exceeded. In one embodiment, the threshold represents an increase in NOx by a factor of 1.5.

Figure 6:
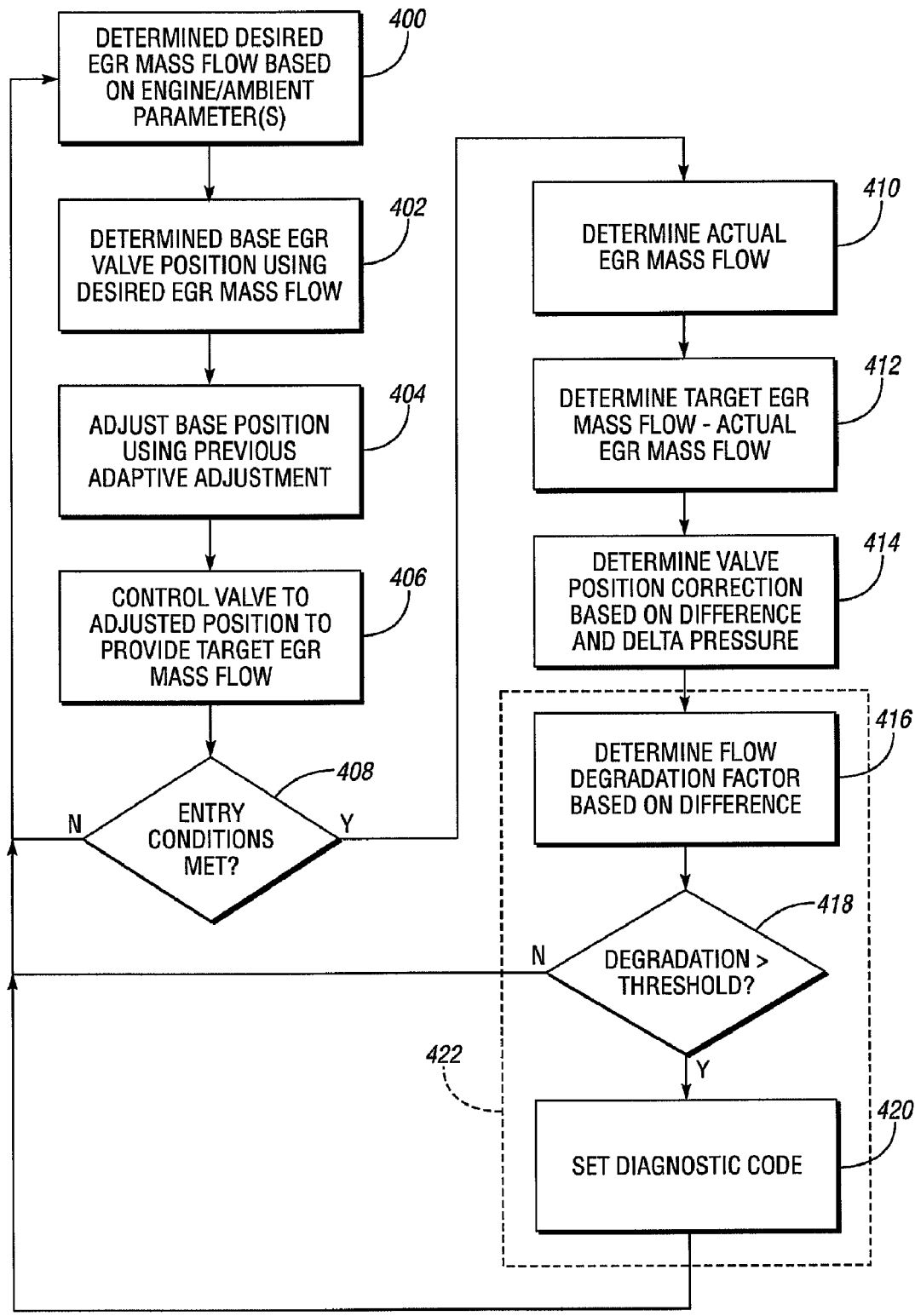
FIG. 6 is a flow chart illustrating control logic for a system or method of controlling EGR flow according to embodiments of the present disclosure.

FIG. 6 illustrates operation of a system or method for EGR mass flow control and diagnostics according to embodiments of the present disclosure. The diagram of FIG. 6 provides a representative control strategy for an internal combustion engine having an EGR system with a minimal flow restriction device or orifice according to the present disclosure. The control strategy and/or logic illustrated in FIG. 6 is generally stored as code implemented by software and/or hardware in controller 12. Code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. Preferably, the control logic or code represented by the simplified flow chart of FIG. 6 is implemented primarily in software with instructions executed by a microprocessor-based vehicle, engine, and/or powertrain controller, such as controller 12 (FIG. 1). Of course, the control logic may be implemented in software, hardware, or a combination of software and hardware in one or more controllers depending upon the particular application. When implemented in software, the control logic is preferably provided in one or more computer-readable storage media having stored data representing code or instructions executed by a computer to control the engine. The computer-readable storage media may include one or more of a number of known physical devices which utilize electric, magnetic, optical, and/or hybrid storage to keep executable instructions and associated calibration information, operating variables, and the like.

A desired EGR mass flow is determined based on engine and/or ambient operating parameters, such as speed/load, torque and/or temperature, as represented at 400. The desired EGR mass flow is used to determine a base or mapped EGR valve position to deliver the desired or target EGR flow for the current operating conditions using a stored map or look-up table as represented at 402. The base valve position is then adjusted by a previously determined adaptive adjustment or correction value as represented at 404. The resulting EGR desired valve position (voltage) is then used by a position feedback controller to move the EGR valve to a position different from the originally determined base position to provide the target EGR mass flow as represented at 406. Those of ordinary skill in the art will recognize that the EGR valve is typically not commanded to move to the base position. Rather, the base position represents a preliminary determination that is adjusted by the adaptive correction value prior to commanding the valve to move. The valve is then controlled using a feedback position controller to provide the target EGR mass flow as represented at block 406.

As also illustrated in FIG. 6, adaptive mode entry conditions are tested at 408. If entry conditions are satisfied, the valve position correction value may be determined or updated in an adaptive value learning mode. In the adaptive learning mode, an actual EGR mass flow is determined at 410 based on the differential pressure across the orifice as previously described. A difference between the actual EGR mass flow and the target EGR mass flow is determined at 412. The difference may be converted to a corresponding EGR valve position correction value (voltage) and stored in memory so that it is available for subsequent adjustment of the base EGR valve position as represented at 414.

An EGR flow monitor 422 may determine a degradation factor as represented at 416 and compare the degradation factor to a corresponding threshold at 418. A diagnostic code may be triggered when the degradation factor exceeds the threshold as represented at 420. The diagnostic code may be stored in memory, used to alert an operator, and/or used to implement an associated alternative or remedial control strategy. Those of ordinary skill in the art will appreciate that the EGR monitor function 422 may operate independent of whether entry conditions are met as determined at 408, with the illustration of FIG. 6 provided for convenience only. Furthermore, EGR flow monitor 422 may actually be suspended during adaptive learning mode and for some time period thereafter depending on the particular application and implementation.

As the embodiments described above illustrate, the present disclosure provides an EGR flow control with various advantages. EGR flow control according to the present disclosure may be implemented primarily in control logic or software with an orifice provided by an EGR valve gasket that may be applied to existing systems. An EGR flow monitor according to the present disclosure detects flow degradation and reduces occurrences of diagnostic codes associated with out of range position sensors.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, as one skilled in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure and may be desirable for particular applications.

What is claimed:

1. A method for controlling an internal combustion engine having an EGR valve, the method comprising:
   determining a base valve position to deliver a target EGR flow for an operating condition using a stored map;
   adjusting the base valve position in response to differential pressure across an orifice in the EGR flow to move the valve to a position different from the base position to provide the target flow; and
   determining a flow degradation factor based on a comparison of an initial calibrated pressure differential for the operating condition with a current value for the operating condition.

2. The method of claim 1 wherein the operating condition comprises engine speed and load.

3. The method of claim 1 further comprising:
   determining differential pressure based on a difference between exhaust back pressure and manifold absolute pressure.

4. The method of claim 1 wherein the orifice comprises an EGR valve gasket.

5. The method of claim 1 wherein the orifice comprises a sharp edge orifice.

6. The method of claim 1 wherein the EGR flow is an EGR mass flow, the method further comprising:
   determining an actual EGR mass flow based on the differential pressure across the orifice;
   determining a difference between the actual EGR mass flow and the target EGR mass flow; and
   determining an EGR base valve position adjustment based on the difference.

7. The method of claim 6 wherein the orifice is positioned upstream of the EGR valve and the actual EGR mass flow is determined according to:

$$\text{mass flow} = K * \text{sqrt}(\text{exhaust backpressure} - \text{MAP})$$

where K is an empirically determined constant, MAP represents a current manifold absolute pressure.

8. The method of claim 6 wherein the orifice is positioned downstream of the EGR valve and the actual EGR mass flow is determined according to:

mass flow=$K$*sqrt(exhaust back pressure−MAP)
*MAP where K is an empirically determined constant and MAP represents a current manifold absolute pressure.

9. The method of claim 1 further comprising:
generating a diagnostic code when the flow degradation factor exceeds a corresponding threshold.

10. The method of claim 9 wherein the corresponding threshold is determined based on a relationship between EGR mass flow and NOx produced during combustion.

11. A system comprising:
a diesel fuel engine having an intake manifold and an exhaust manifold with an exhaust gas recirculation passage coupled therebetween;
an EGR valve positioned in the exhaust gas recirculation passage;
a flow restricting orifice positioned within the exhaust gas recirculation passage;
an exhaust backpressure sensor positioned upstream of the EGR valve;
a MAP sensor coupled to the intake manifold;
a controller in communication with the EGR valve, the exhaust backpressure sensor and the MAP sensor, the controller determining a base valve position to deliver a target EGR mass flow for the operating condition using a stored map, and adjusting the base valve position in response to differential pressure across the orifice to move the EGR valve to a position different from the base valve position to provide the target flow; and
an EGR flow diagnostic monitor in communication with the EGR valve, the exhaust back pressure sensor, the MAP sensor and the controller, wherein the EGR flow diagnostic monitor detects flow degradation and generates a diagnostic code when a flow degradation factor exceeds a corresponding threshold.

12. The system of claim 11 wherein the operating condition comprises engine torque.

13. The system of claim 11 wherein the controller determines differential pressure based on a difference between exhaust back pressure and manifold absolute pressure.

14. The system of claim 11 wherein the orifice comprises an EGR valve gasket.

15. The system of claim 11 wherein the orifice is positioned downstream of the EGR valve.

16. The system of claim 11 further comprising:
a differential pressure sensor for measuring pressure immediately upstream and downstream of the orifice.

17. A method for controlling an engine having an EGR flow diagnostic monitor, comprising:
determining a flow degradation factor;
comparing the flow degradation factor to a corresponding threshold;
generating a diagnostic code when the flow degradation factor exceeds the corresponding threshold; and
triggering a remedial control action in response to the flow degradation factor exceeding the corresponding threshold.

18. The method of claim 17 wherein the flow degradation factor is determined by comparing an initial calibrated pressure differential for an operating condition with a current value for the same operating condition.

19. The method of claim 17 wherein the corresponding threshold is determined based on a relationship between EGR mass flow and NOx produced during combustion.

20. The method of claim 17 wherein the remedial control action includes storing the diagnostic code in memory.

* * * * *